(12) United States Patent
Hjelsand et al.

(10) Patent No.: US 6,575,263 B2
(45) Date of Patent: Jun. 10, 2003

(54) TORQUE DEVICE FOR ELECTRONIC STEER-BY WIRE STEERING SYSTEMS

(75) Inventors: Timothy A. Hjelsand, Waconia, MN (US); Kenneth G. Rasmussen, Maple Grove, MN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/843,973

(22) Filed: Apr. 26, 2001

(65) Prior Publication Data

US 2002/0157894 A1 Oct. 31, 2002

(51) Int. Cl.[7] .............................................. B62D 5/00
(52) U.S. Cl. ................................... 180/402; 180/444
(58) Field of Search ............................... 180/402, 403, 180/443, 444

(56) References Cited

U.S. PATENT DOCUMENTS

| | | | |
|---|---|---|---|
| 4,936,094 A | 6/1990 | Novacek ........................ 60/384 |
| 5,462,132 A | * 10/1995 | Tanke et al. .............. 137/625.21 |
| 5,873,243 A | 2/1999 | Uppal et al. .................... 60/384 |
| 6,095,277 A | 8/2000 | Bohner et al. ................ 180/403 |
| 6,102,150 A | 8/2000 | Bohner et al. ................ 180/403 |
| 6,138,788 A | * 10/2000 | Bohner et al. ................ 180/402 |
| 6,202,694 B1 | * 3/2001 | Gilbert et al. ............. 137/625.23 |
| 6,208,922 B1 | 3/2001 | Easton ............................ 701/41 |
| 2002/0108804 A1 | * 8/2002 | Park et al. ..................... 180/444 |

\* cited by examiner

Primary Examiner—Kevin Hurley
(74) Attorney, Agent, or Firm—L. J. Kasper (57) ABSTRACT

A steer-by-wire vehicle steering system and method of controlling such a steering system when steering into and away from a steering stop. In one embodiment, the system includes a steering reaction device (55) including a fluid displacement mechanism (71), and a valve arrangement (95) operable to vary the steering reaction provided to the vehicle operator. In another embodiment, there is a "friction" reaction device (111) including an electromagnetic coil (115) which can have a varying signal (61) applied to it to vary the steering reaction the coil imposes on a movable member (113) of the device (111). In either embodiment, the reaction device includes a spring arrangement (93;131), such that rotation of the steering wheel (51) is in opposition to a spring force. In accordance with the method of the invention, as the operator steers into a stop, the reaction torque increases enough to prevent turning the steering wheel (51) further, but when the operator turns the wheel to steer away from the stop, the system senses the reversed direction of steering and reduces substantially the steering reaction which the operator senses.

2 Claims, 6 Drawing Sheets

TORQUE DEVICE FOR ELECTRONIC STEER-BY WIRE STEERING SYSTEMS

BACKGROUND OF THE DISCLOSURE

The present invention relates to power steering systems, and more particularly to such steering systems of the type which are typically referred to as being of the "steer-by wire" type.

As will be understood by those skilled in the art, a typical steer-by-wire system is to be distinguished from the known, prior art vehicle steering systems of the following types:

(1) mechanical steering systems, in which there is a mechanical link between the steering wheel and the steered wheels and the entire steering torque to the steered wheels is merely the result of steering input effort provided by the vehicle operator;

(2) mechanical steering with hydraulic power assist, in which there is a mechanical link between the steering wheel and the steered wheels, but the operator input is assisted by hydrostatic fluid pressure acting on, for example, opposite ends of a rack and pinion device; and (3) a fully hydrostatic power steering system, in which there is no mechanical link between the steering wheel and the steered wheels, and all steering torque is the result of hydrostatic fluid pressure communicated to a steering actuator from a steering control unit (SCU), the input to which is the manual steering effort of the operator.

A typical steer-by-wire system could be a type of hydrostatic power steering system, but could also be a fully electric steering system, as will be explained in greater detail subsequently. In the typical steer-by-wire system, the rotation of the steering wheel by the vehicle operator is sensed, and results in the generation of a steering command signal which is transmitted as one of the inputs to an electrical logic device, such as the vehicle microprocessor. Another input to the microprocessor is the instantaneous steered wheel position, typically generated by a sensor associated with the steering cylinder. In response to the various input signals received, the microprocessor transmits a control signal to a proportional steering valve, which controls the flow of fluid from a steering pump to the steering cylinder. Therefore, the only "connection" between the vehicle operator and the steering valve is the electrical command signal (wire) from the microprocessor, and hence, the name "steer-by-wire".

Steer-by-wire systems are becoming increasingly popular on a variety of vehicle applications. In the conventional fully hydrostatic power steering system, there is a steering input device (such as the SCU), which receives its input from the steering wheel by means of the steering column, and therefore, the SCU is typically disposed in, or immediately adjacent the operator compartment. In such a hydrostatic steering system, all of the flow within the steering system passes through the SCU, and therefore, there is a large flow of pressurized fluid in close proximity to the operator compartment. As a result, there is likely to be the noise and vibration normally associated with the flow of pressurized fluid, readily discernible by the operator. In the case of a steer-by-wire system, the steering input device disposed in or near the operator compartment does not have the steering system fluid flow passing through it. Only the proportional steering valve has substantial fluid flow passing through it, but the proportional steering valve is typically mounted somewhere near the steering cylinder, well away from the operator compartment. Therefore, the device which constitutes the major source of noise and vibration in a hydrostatic power steering system is eliminated in a steer-by-wire system, and replaced by a valve which does not have to be located in or near the operator compartment.

One of the problems associated with the typical, prior art steer-by-wire steering system is a relatively poor "torque feel". In many such systems, the input portion of the system merely comprises a steering wheel and steering column, and the associated sensors needed to sense steering wheel position, rate of rotation, etc. As a result, when the vehicle operator turns the steering wheel to accomplish a steering maneuver, there is very little torque feel of the type the operator would normally experience when rotating the steering wheel in any of the known mechanical/hydrostatic systems described above.

In many vehicle applications, it would be desirable for the steer-by-wire system to have not only an appropriate level of torque feel, but also, the ability for the system to vary the torque feel to correspond to changes in the various steering system parameters. For example, as one system design option, the steer-by-wire system could be made to have a feel which is very similar to what the operator would normally experience in driving an automobile, in which the reaction torque could be made to decrease as the vehicle speed increases. Alternatively, the steer-by-wire system could be made to have a feel similar to conventional hydrostatic power steering in which the torque feel could be made to increase as the vehicle operator would increase the rate of rotation of the steering wheel.

Finally, it would be desirable for the torque feel to greatly increase, to the point of effectively preventing further rotation of the steering wheel, whenever the steered wheels approach the "stops", i.e., when the steered wheels reach their maximum steering angle. Unfortunately, in some prior art systems, the attempt to increase the reaction torque as the operator steers into a stop has merely hampered the subsequent steering operation in the opposite direction, away from the stop. By way of example only, in some systems which have been proposed, the means which provides the increased torque feel just before reaching the steering stops would still be engaged or "applied" as the operator would attempt to steer away from the stop, i.e., the torque feel would be as great steering away from the stops as it was approaching the stops, which is clearly undesirable.

BRIEF SUMMARY OF THE INVENTION

Accordingly, it is an object of the present invention to provide an improved steer-by-wire vehicle power steering system which overcomes the disadvantages of the prior art systems, and which is capable of providing the vehicle operator with improved torque feel.

It is a more specific object of the present invention to provide such an improved steer-by-wire system which is also capable of varying the torque feel experienced by the operator in response to variations in vehicle and steering system operating parameters.

It is a further object of the present invention to provide such an improved steer-by-wire system which accomplishes the above-stated objects, and which includes the ability to provide the operator with substantially increased torque feel when the system reaches the end of steering stops, while maintaining the ability to steer easily away from the stop.

The above and other objects of the invention are accomplished by the provision of an improved steer-by-wire vehicle steering system including a steered wheel actuator assembly operable to provide steering movement to a pair of steered wheels in response to changes in an input signal. A controller is operable to generate the input signal for transmittal to the steered wheel actuator assembly, and to generate a feedback signal. A steering actuator assembly includes a steering input device adapted to receive a steering input motion from a vehicle operator, a steering reaction device adapted to be driven by the steering input device and to provide a steering reaction to the vehicle operator, and a steering motion sensor adapted to sense the steering input motion and transmit a motion signal to the controller. The steering actuator assembly includes means operable to vary the steering reaction provided to the vehicle operator in response to variations in the feedback signal generated by the controller.

The improved steer-by-wire vehicle steering system is characterized by the steering reaction device comprising a housing defining a fluid inlet port and a fluid outlet port, a fluid displacement mechanism, and valving operable to control the flow of fluid from the inlet port through the displacement mechanism to the outlet port in response to movement of the steering input device. The valving defines a neutral condition blocking fluid flow through the displacement mechanism, and includes means biasing the valving toward the neutral condition.

In accordance with another aspect of the invention, an improved steering system is provided of the type including a friction type steering reaction device adapted to receive a manual steering input, the reaction device including a first member and friction reaction means to resist rotation of the first member.

The improved steering system is characterized by the reaction device including a spool member fixed to rotate with the manual steering input, and a sleeve member fixed to rotate with the first member of the reaction device, and at least partially surrounding the spool member. A spring biasing arrangement has a first end seated relative to the spool member and a second end seated relative to the sleeve member. The spool member and the sleeve member are configured to permit a predetermined rotational displacement between the spool member and the sleeve member in opposition to an increasing biasing force exerted by the spring biasing arrangement.

DETAILED DESCRIPTION OF THE PREFERRED EMBODIMENT

Figure 1:
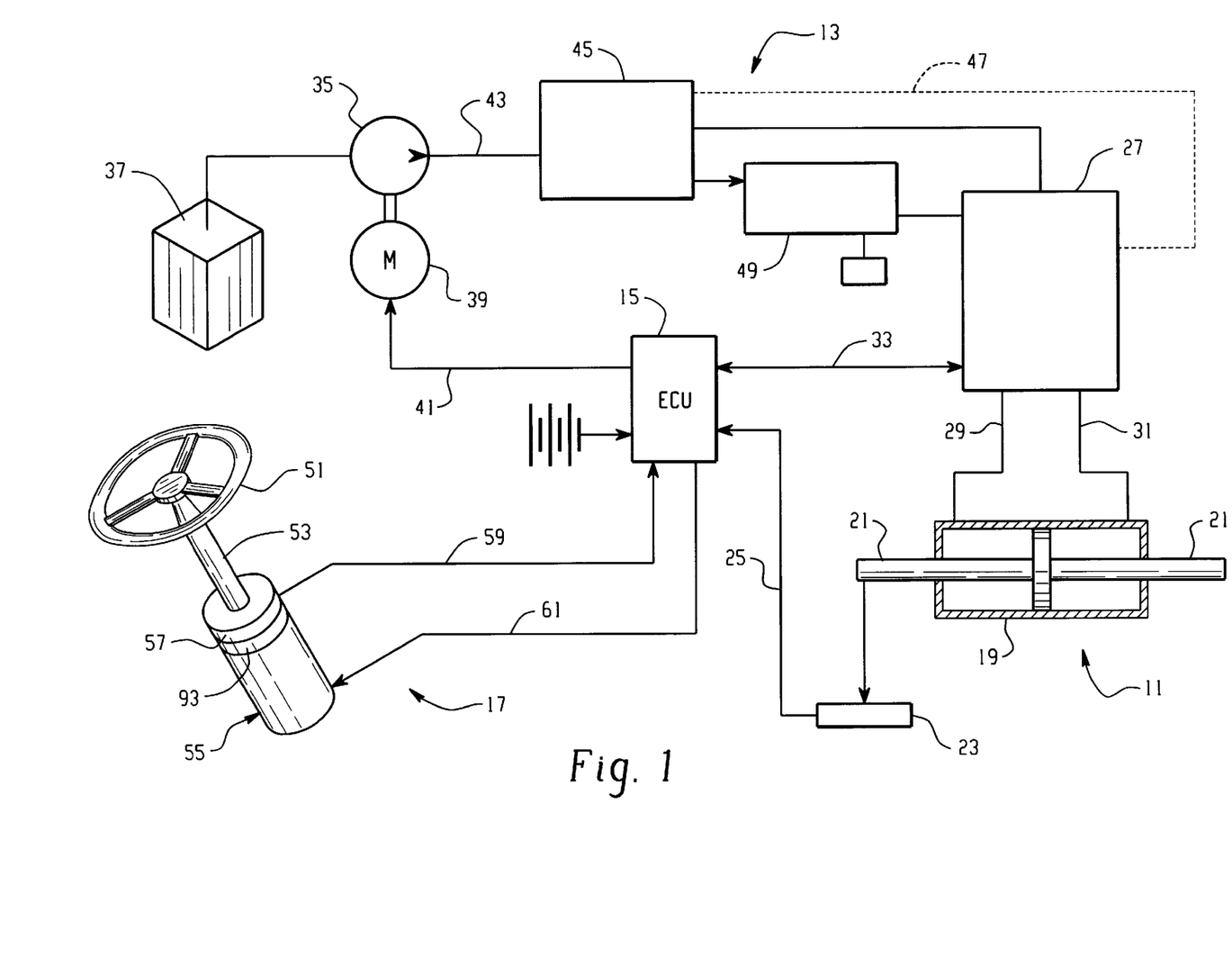
FIG. 1 is an overall system schematic of one embodiment of a steer-by-wire vehicle steering system of the type to which the present invention relates.

Referring now to the drawings, which are not intended to limit the invention, FIG. 1 is an overall schematic one embodiment of a steer-by-wire vehicle steering system of the type with which the present invention may be utilized. The steer-by-wire steering system shown schematically in FIG. 1 includes a steered wheel actuator assembly, generally designated 11; a vehicle fluid pressure source, generally designated 13; a vehicle microprocessor (or electronic control unit, ECU), generally designated 15; and a steering actuator assembly, generally designated 17. As was noted previously, instead of a system which is basically a hydrostatic power system such as that shown in FIG. 1, the present invention could be utilized with a steering system which is all electrical, in which case, by way of example only, the steered wheel actuator assembly 11 could comprise an electric motor of either the rotary or linear type.

The steered wheel actuator assembly 11 of the preferred embodiment includes a steering cylinder 19 shown schematically in FIG. 1 as having a piston rod 21 extending from each end of the cylinder 19. The piston rods 21 would be operably associated with the steered wheels (not shown) of the vehicle in any conventional manner, the details of which are not essential features of the present invention. Shown schematically in FIG. 1 is a steered wheel position sensor 23, which senses the linear position of the adjacent piston rod 21 and transmits an electrical signal 25 to the ECU 15, the signal 25 being representative of the instantaneous steered wheel position, as is now quite well known to those skilled in the steering art.

The steered wheel actuator assembly 11 also includes a proportional steering valve 27 which may comprise any of a number of well known proportional valves. Typically, the steering valve 27 would comprise a conventional three-position, four-way, electromagnetically operated valve assembly having its outlet ports connected by means of a pair of conduits 29 and 31 to the opposite ends of the steering cylinder 19. The operation of the steering valve 27, from a normal, neutral condition to either a left turn or right turn condition, occurs in response to changes in an input command signal 33, transmitted from the ECU 15 to the steering valve 27.

The vehicle fluid pressure source 13 comprises a fluid pump 35, shown schematically herein as being a fixed displacement pump, which receives fluid from a reservoir 37. The pump 35 is driven by an electric motor 39, in response to an electrical signal 41 transmitted to the motor 39 from the ECU 15. The fluid output of the pump 35 is communicated by means of a conduit 43 to a load sensing priority flow control valve (LSPV), generally designated 45, which may be of the general type illustrated and described in U.S. Pat. No. 3,455,210, assigned to the assignee of the present invention and incorporated herein by reference. The LSPV 45 responds to a load signal 47 to apportion fluid between the priority device, i.e., the steering valve 27, and an auxiliary circuit 49, which may comprise any one of a number of hydraulic functions on the particular vehicle (typically, a function other than steering or brakes). The load signal 47, communicated to the LSPV 45 from the steering valve 27, is representative of the load imposed on the actuator assembly 11 during steering.

The steering actuator assembly 17 includes a conventional steering wheel 51 and steering column 53 which receive the steering input motion from the operator and transmit that motion to a steering input device 55. The steering input device 55 includes, or has disposed adjacent thereto, some sort of steering input sensor 57 which transmits to the ECU 15 an electrical signal 59 corresponding to the motion of the steering wheel 51. Preferably, the steering input signal 59 will provide to the ECU 15, and to the system logic contained therein, at least the following information:

(1) whether or not the steering wheel 51 is moving;
(2) if so, in which direction (CW or CCW) is the steering wheel 51 moving; and
(3) what is the instantaneous speed of rotation of the steering wheel 51.

As will be explained in greater detail subsequently, the ECU 15 transmits to the input device 55 an electrical signal 61 which is representative of the instantaneous level of reaction torque which is appropriate for the system, under the conditions which exist at that point in time. It should be understood that hereinafter, and in the appended claims, the terms "reaction torque"; "steering reaction"; "torque feel" and perhaps other terms of similar import are used synonymously, and are understood to be equivalent. Therefore, it should be understood by those skilled in the art that the steering input device 55 could take many forms, several of which will be illustrated and described herein in greater detail subsequently. It also should be understood by those skilled in the art, from a reading and understanding of this specification, that the details of the input device 55 are not essential features of the invention, except to the extent set forth in the appended claims. What is important in regard to the steering input device 55 is that it provide the vehicle operator with an appropriate level of reaction torque, in response to rotation of the steering wheel 51. Preferably, a portion of the reaction torque is inherent in the steering input device 55, and the remainder of the reaction torque occurs in response to the electrical signal 61, as will be explained in greater detail subsequently.

Figure 2:
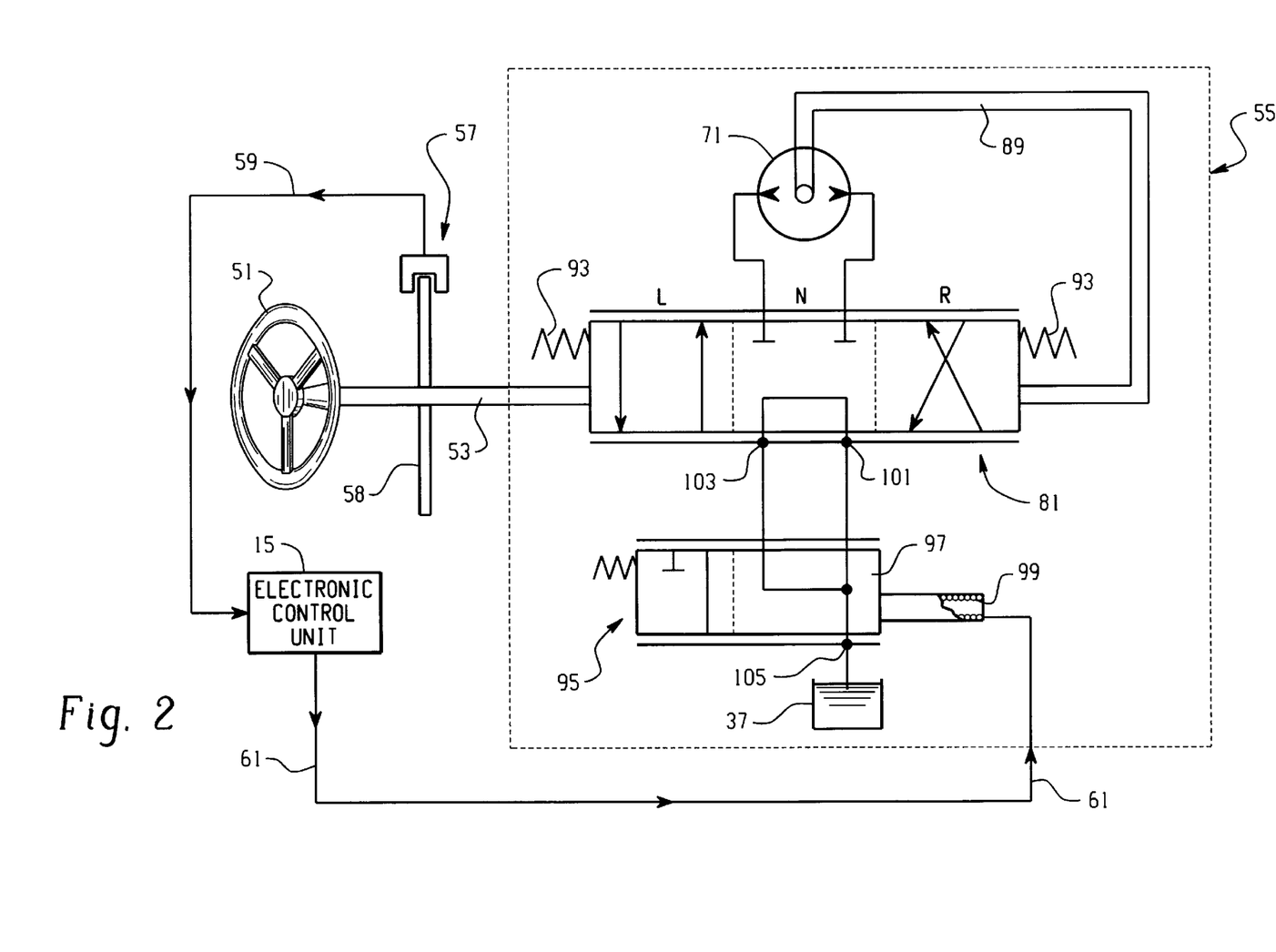
FIG. 2 is a hydraulic schematic of one embodiment of the steering actuator assembly which is shown as part of the system schematic of FIG. 1.
Figure 3:
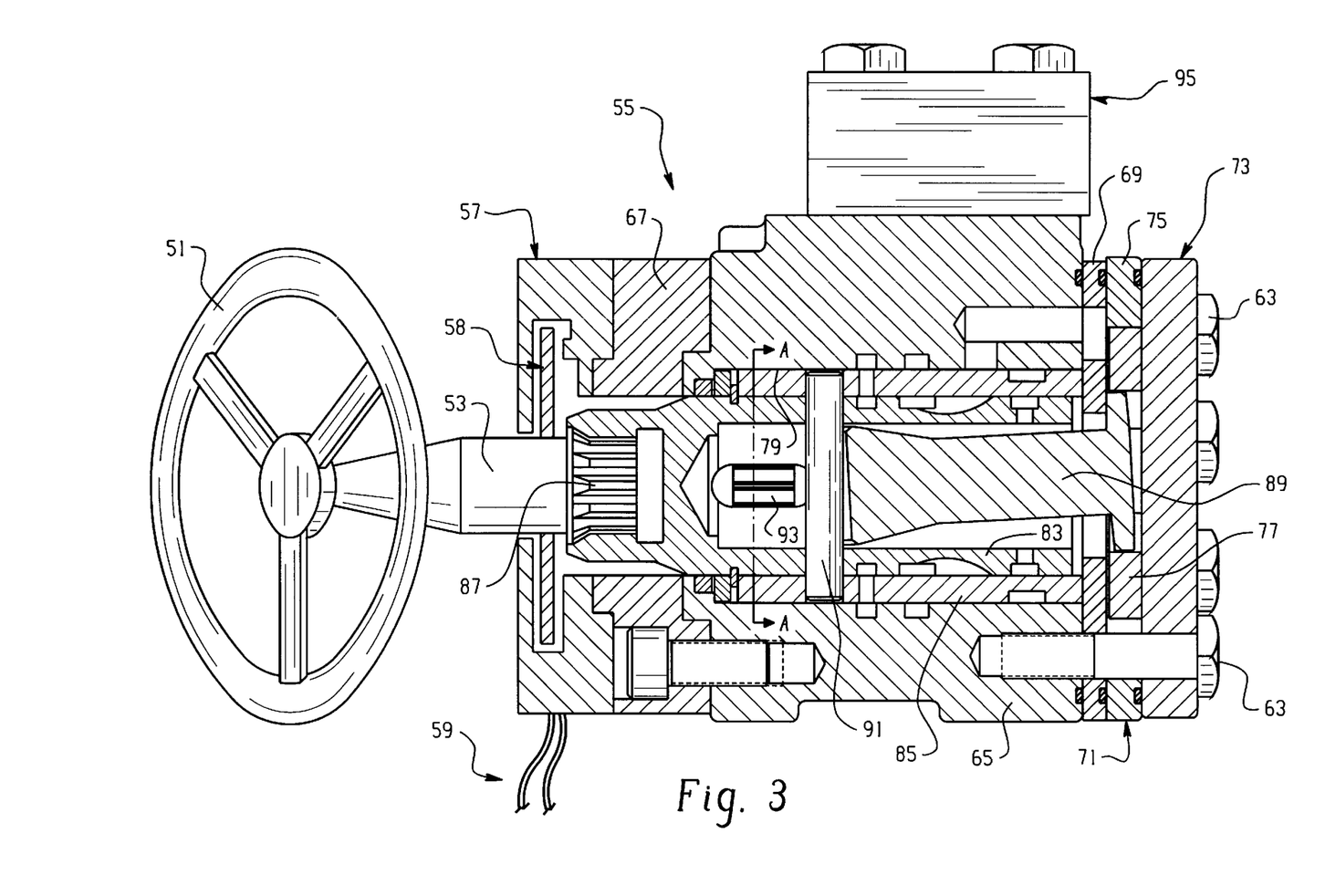
FIG. 3 is an axial cross-section of the steering actuator assembly shown schematically in FIG. 2.
Figure 3A:
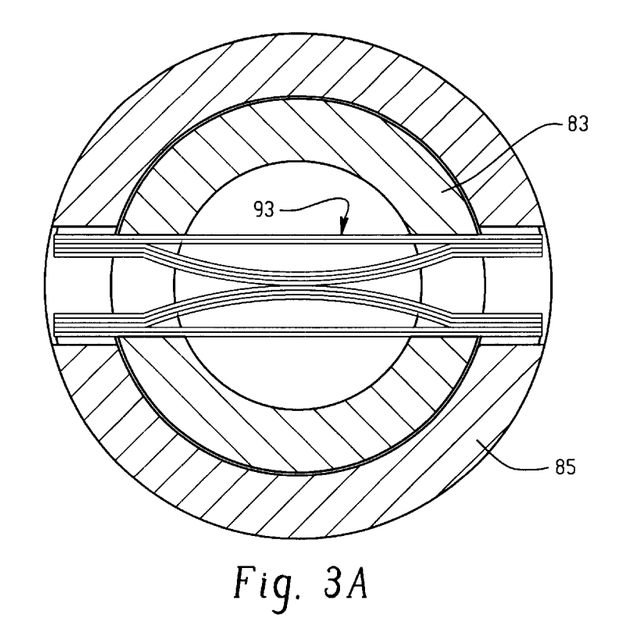
FIG. 3A is a transverse cross-section taken on line A—A of FIG. 3, illustrating the centering spring arrangement utilized as one aspect of the present invention.

Referring now primarily to FIGS. 2 and 3, one embodiment of the steering input device 55 will be described. The device 55 may be made generally in accordance with the teachings of U.S. Pat. Nos. 4,936,094 and 5,873,243, both of which are assigned to the assignee of the present invention and incorporated herein by reference. The device 55 does, however, vary from the devices illustrated in the above-incorporated patents, as will become apparent subsequently to those skilled in the art, upon a reading and understanding of the present specification.

Referring now primarily to FIG. 3, but also to FIG. 2 as appropriate, the steering input device 55 comprises a plurality of sections held in tight sealing engagement by a plurality of bolts 63, including a valve housing section 65, and attached thereto, a front end cap 67. In the subject embodiment, and by way of example only, the steering input sensor 57 comprises a separate forward housing section attached to the front end cap 67, and disposed therein is a rotary sensor disc 58. Disposed at the rearward end of the housing section 65 is a wear plate 69, a gerotor displacement mechanism, generally designated 71, and a rearward end cap 73. In a manner well know to those skilled in the art, the gerotor displacement mechanism 71 includes an internally toothed ring member 75 and an externally toothed star member 77 which is eccentrically disposed within the ring member 75 for orbital and rotational movement therein. Other types of fluid displacement mechanisms may be used, instead of gerotor gear sets, examples of such other mechanisms being devices of the gear type, or of the sliding vane type.

The valve housing section 65 defines a valve bore 79, and disposed therein is a valving arrangement, generally designated 81 (see FIG. 2). In the subject embodiment, and by way of example only, the valving arrangement 81 includes a primary rotatable valve member 83 (spool valve), and a relatively rotatable, follow-up valve member 85 (sleeve valve). The spool valve 83 typically has, at its forward end (left end in FIG. 3) a set of internal splines 87 for engagement with mating external splines (not shown herein) on the steering column 53, such that rotation of the steering wheel 51 and the steering column 53 results in rotation of the spool valve 83.

As is well know to those skilled in the art of hydrostatic steering valves, one function of the gerotor displacement mechanism 71 is to measure the volume of fluid flow through the mechanism 71 (also referred to as a "fluid meter"), and transmit a follow-up movement to the valving arrangement 81 which is proportional to the flow through the fluid meter 71. More particularly, the follow-up movement is transmitted to the sleeve valve 85 by means of a main drive shaft 89, which is preferably in splined engagement with the star 77. The rotational follow up motion of the forward end of the shaft 89 is transmitted to the sleeve valve 85 by means of a transverse pin 91 which passes through circumferentially elongated openings in the spool valve 83 and has its ends received within close-fit bores in the sleeve valve 85, as is quite well known in the SCU art.

Figure 4:
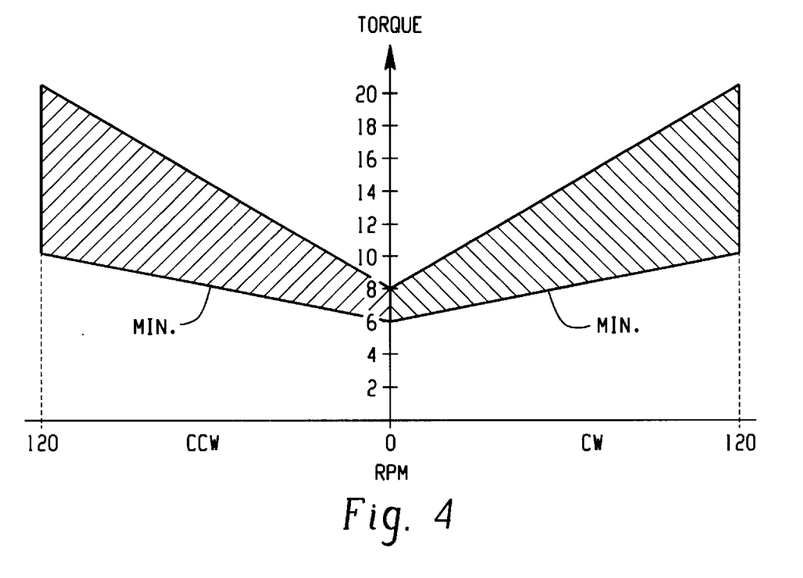
FIG. 4 is a graph of steering reaction ("Torque") vs. speed of steering wheel rotation ("R.P.M."), illustrating one important aspect of the present invention.

In accordance with one important aspect of the invention, there is a biasing spring arrangement 93, the function of which is to bias the spool valve 83 toward its centered, neutral position (N in FIG. 2) relative to the sleeve valve 85, as is also quite well known in the SCU art. Therefore, any rotation of the steering wheel 51 by the vehicle operator is in opposition to the biasing force of the spring arrangement 93, providing a certain minimum reaction torque or steering reaction corresponding to the line marked "MIN." in the graph of FIG. 4. Further reference will be made to the graph of FIG. 4 in connection with the remaining description of the embodiment of FIGS. 2 and 3.

Referring still primarily to FIGS. 2 and 3, attached to the valve housing section 65, by any suitable means, is a port block valve, generally designated 95, including a moveable valve member 97 (see FIG. 2), which is preferably operated by means of an electromagnetic coil 99. The valve housing section 65 defines a fluid inlet port 101 and a fluid outlet port 103, both of which are shown only schematically, and only in FIG. 2. As is well known to those skilled in the SCU art, a typical SCU for use in a hydrostatic power steering system would have, in addition to an inlet port and an outlet port, a pair of control ports connected to the steering cylinder. However, the steering input device 55 of the invention looks, in axial cross-section, like a conventional SCU, but it has only 2 ports, the inlet port 101 and the outlet port 103, in the same manner as a "torque generating" steering device. Such a torque generating device is illustrated and described in greater detail in above-incorporated U.S. Pat. No. 4,936,094. Therefore, the spool valve 83 and the sleeve valve 85 of the subject embodiment will be clearly understood from the cited '094 patent.

Preferably, the valve member 97 is a two position, three-way valve, having two of its ports connected to the ports 101 and 103, and its third port 105 connected to the system reservoir 37. The general function of the port block valve 95 is to provide a restriction to the flow of fluid within the steering input device 55, thus providing reaction torque over and above that provided by the spring arrangement 93 (refer again to the graph of FIG. 4). In accordance with one aspect of the present invention, the amount of additional reaction torque experienced by the operator while rotating the steering wheel 51 is determined by the position of the valve member 97, and in turn, the position of the valve member 97 is determined by the level of the electrical signal 61 received from the ECU 15, as will be described in greater detail subsequently. With the valve member 97 in the position shown in FIG. 2, there is relatively little restriction to flow because the ports 101 and 103 are interconnected by the valve member 97 such that, as the operator rotates the steering wheel 51, there is only minimal resistance to fluid flow through the valving arrangement 81 (turned to either the right turn ("R") or left turn ("L") position in FIG. 2), through the fluid meter 71, and through the port block valve 95.

As the valve member 97 is moved from the "connected" position shown in FIG. 2 toward the opposite, "blocked" position, the resistance to fluid flow through the steering input device 55 increases, increasing the reaction torque on the steering wheel 51. For example, the ECU 15 constantly reads and compares the electrical signal 59 (steering wheel position) and the electrical signal 25 (steered wheel position) and generates a signal representative of the difference ("error") between the signals 59 and 25. The signal 61 which actuates the valve member 97 from its connected position toward its blocked position would be generally proportional to the error between the steering and steered wheel positions, or stated another way, the greater the instantaneous error, the greater would be the reaction torque added to the system by means of the port block valve 95. As another example of the variability of the reaction torque, the ECU 15 may be programmed such that the electrical signal 61 is inversely proportional to vehicle speed, i.e., as the vehicle speed increases (with all other variables remaining constant), the signal 61 decreases, thus moving the valve member 95 toward the "connected" position shown in FIG. 2, reducing the reaction torque on the system. This latter example would be consistent with the feel of a conventional automotive power steering system.

Figure 5:
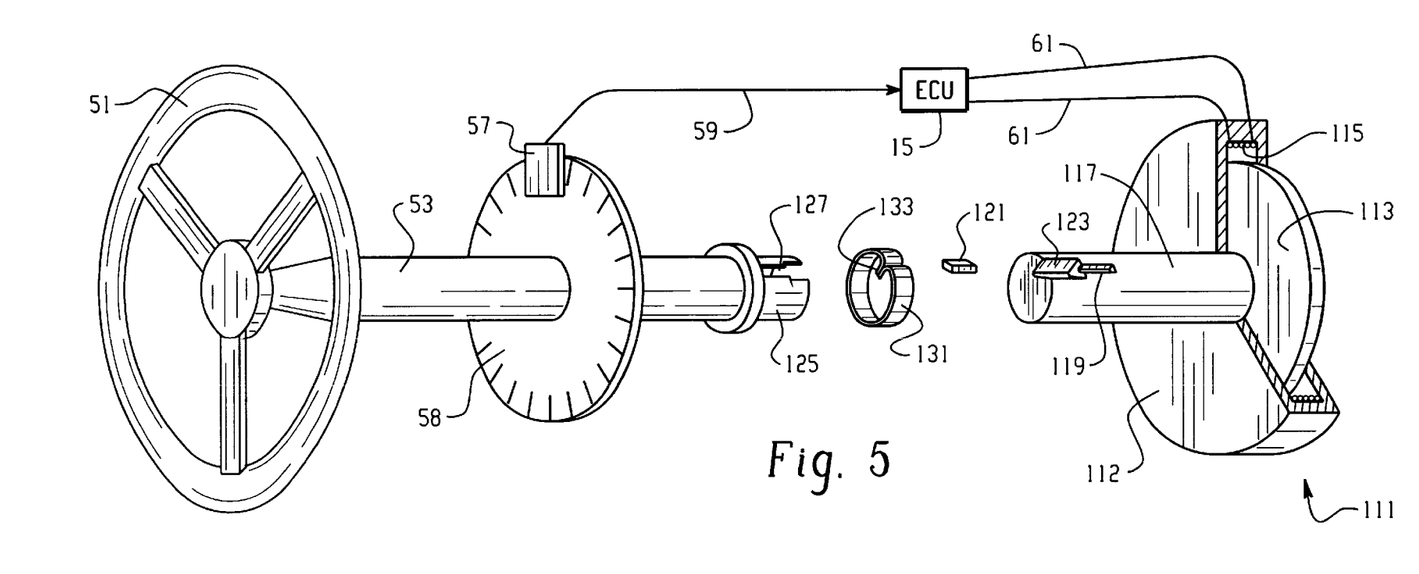
FIG. 5 is a somewhat schematic, exploded, perspective view of an alternative embodiment of the steering actuator assembly of the present invention.

Referring now primarily to FIG. 5, there is illustrated another embodiment of the steering input device, in which like elements bear like reference numerals, and new, or substantially modified elements bear reference numerals in excess of "110". Although the embodiment of FIG. 5 is quite different structurally than that of FIGS. 2 and 3, it is important to note that, at least theoretically, the vehicle operator should not be aware of the difference between the two embodiments, i.e., the steering reaction should feel the same to the operator with either embodiment.

In FIG. 5, which is meant to be somewhat schematic, there is shown a "friction reaction device", generally designated 111, including an annular housing 112, which defines an internal annular chamber within which is disposed a brake disc 113. The term "friction" is used herein in a generic sense to include true friction (mechanical contact) devices, as well as those, such as the device 111 which are electromagnetic, but typically don't involve actual contact between the relatively rotatable members. Disposed within the annular housing 112 is an electromagnetic coil 115, connected electrically to the ECU 15 by means of a pair of electrical leads which transmit to the coil 115 the electrical signal 61, shown schematically in FIGS. 1 and 2. Preferably, a predetermined, minimum current would be maintained across the coil 115, thus providing a predetermined, minimum reaction torque required to rotate the brake disc 113.

Figure 5A:
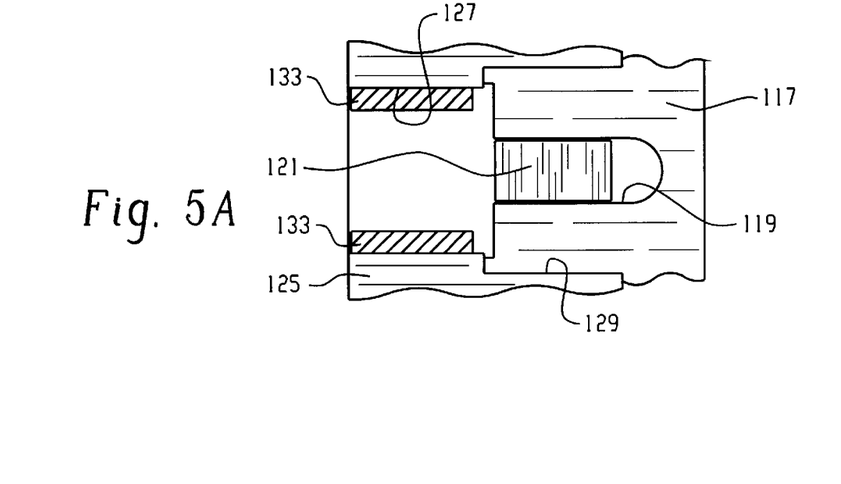
FIG. 5A is a fragmentary, flat plan view of a portion of the alternative embodiment of FIG. 5, illustrating one important aspect of the alternative embodiment.

Attached to the brake disc 113, and extending axially forward therefrom (to the left in FIG. 5), is a shaft member 117 which defines an axially-extending slot 119 in which is disposed a key member 121. The slot 119 opens, toward its left end in FIG. 5, into a larger slot portion 123. The left end of the shaft 117 is received within a cylindrical sleeve-like member 125, which also defines an axially-extending slot 127, opening toward its right end into a larger slot portion 129, which serves as the rotational stops for the key member 121 and sleeve-like member 125, as may best be seen in FIG. 5A. Although the alternative embodiment has been described, by way of example only, with the shaft member 117 extending from the brake disc 113, and the sleeve-like member 125 extending from the steering column 53, those skilled in the art will understand that, within the scope of the invention, this arrangement is not essential, and could be reversed. All that is essential is that there be some such arrangement of shafts (spools) and sleeves and a spring and some means to limit relative rotation within the assembly.

Surrounding the sleeve-like member 125 is a generally annular torsion spring 131 having a pair of inwardly-extending ends or tabs 133 which are received within the slot 127 of the sleeve-like member 125, and extend radially into the larger slot portion 123 of the shaft member 117. The spring 131, just described, functions in basically the same manner as the centering spring arrangement 93 of the main embodiment, and the key member 121 within the larger slot portion 129 functions in basically the same manner as the transverse pin 91 in the main embodiment. In either case, the spring permits rotation of the steering wheel 51, but with a certain steering reaction occurring, and the pin 91 (or key member 121) limits the amount of relative rotation which can occur between the steering wheel 51 and the friction reaction device (the fluid displacement mechanism 71 or the electromagnetic device 111).

In operation, the beginning of rotation of the steering wheel 51 results in compression of the springs (93 or 131) because in either embodiment, there is a certain, minimum break away torque in the friction device (55 or 111). In the case of the hydraulic steering input device 55 of the main embodiment, the minimum break away torque is achieved by blocking the normal commutation ports in the valving 81, thus preventing rotation of the fluid displacement mechanism 71 until there is sufficient relative rotation of the spool valve 83 and sleeve valve 85 to open the commutation ports, which are well known to those skilled in the art, and are illustrated and described in the above-incorporated patents. In the case of the friction reaction device 111, the break away torque is set by a predetermined, minimum voltage applied to the coil 115. Note the minimum value of V (voltage) associated with the determination of the constants K1 and K2 in FIG. 6. Alternatively, and as is well known in the electromagnetic art, a certain residual magnetic field strength could be built into the device 111 to achieve the minimum reaction torque.

Figure 6:
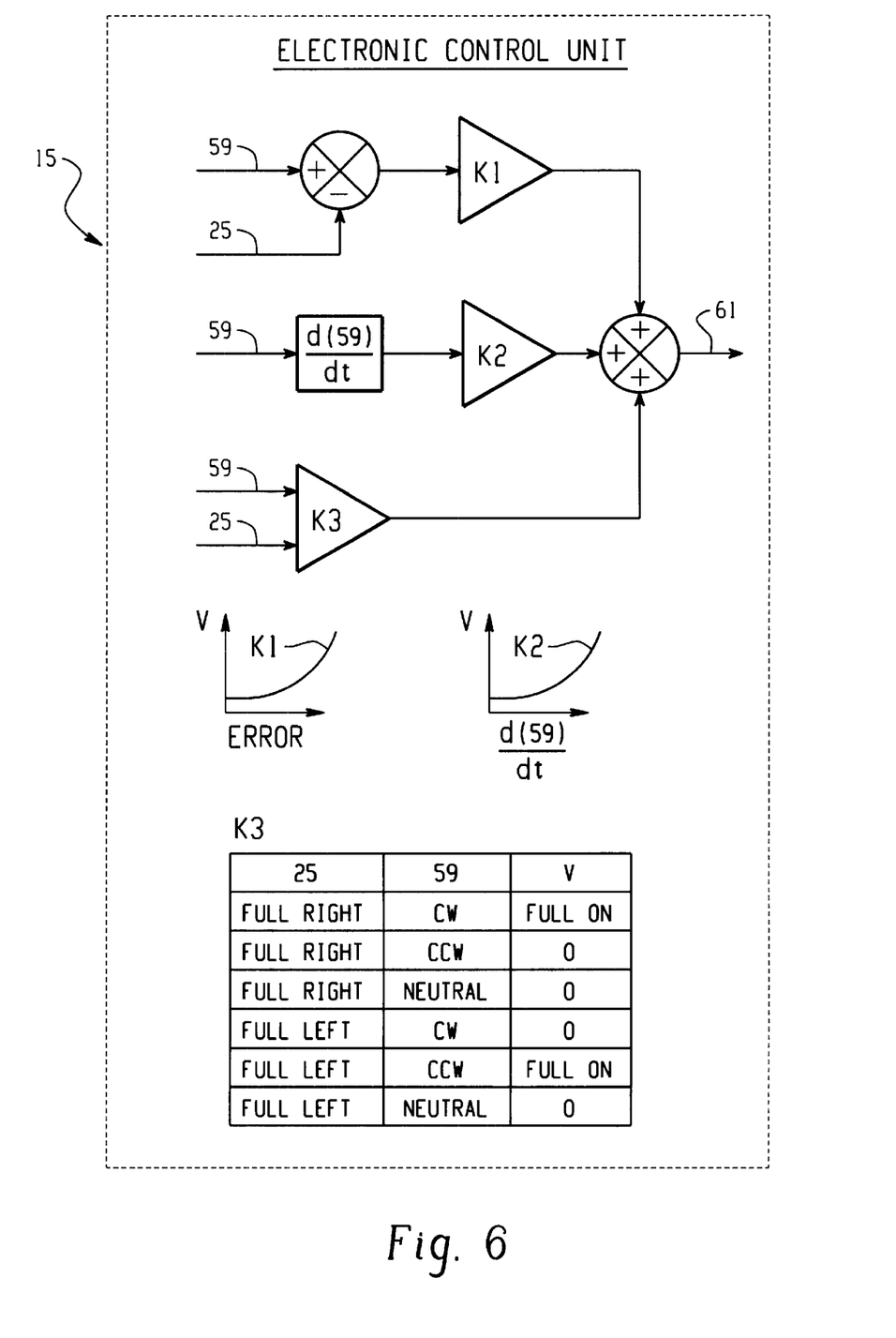
FIG. 6 is a logic diagram illustrating the control logic, which comprises one important aspect of the invention, and which may be utilized in connection with the steering actuator assembly of the present invention, regardless of which embodiment of actuator is utilized.

As rotation of the steering wheel 51 continues, the springs are compressed sufficiently to overcome the minimum break away torque of the friction device (55 or 111) so that the friction device itself begins to rotate (i.e., the star 77 or the brake disc 113). Rotation of the steering column 53 is sensed by the steering motion sensor (57), resulting in the generation of an appropriate command signal 33 which is transmitted to the proportional steering valve 27, controlling the movement of the valve 27 to control the flow of fluid to the steering cylinder 19. Steering cylinder position is sensed by the sensor 23 and the position signal 25 is transmitted to the ECU 15, wherein the signal 25 is compared to the steering wheel position signal 59, as shown in FIG. 6, to generate an error signal which, when multiplied by the constant K1, results in an appropriate signal 61.

The signal 61 is then sent to the friction device (and specifically, to either the coil 99 or the coil 115) to vary the steering reaction torque in accordance with the predetermined relationship. In either embodiment, an increase in the voltage to the coil (99 or 115) would cause an increase in the torque required to rotate the friction device which, in turn, would cause an increased compression of the springs (93 or 131) and therefore, an increased torque reaction at the steering wheel 51.

It should be noted that, in either embodiment of the steering input device, the "order" of the of the elements in the torque path (which may not be the same as the physical arrangement of the elements) is the same, starting with the steering wheel 51, then the steering column 53, then the steering input sensor 57, then the centering (biasing) spring arrangement 93 (or 131), then, finally, the reaction device, i.e., the device which produces the steering reaction. As a result, in either embodiment, the steering-at-the-stops functions in the same manner. When the steering cylinder 19 approaches the end of its travel (the "stops"), electrical signal 25 which is transmitted to the ECU 15 is operated upon by the system logic to produce a signal 61 ("FULL ON" in FIG. 6) which, in the case of the main embodiment, will move the valve member 97 fully to the blocked position shown in FIG. 2, blocking flow through the ports 101 and 103. Thus, the fluid displacement mechanism 71 will not rotate any further, and when the spring arrangement 93 is fully compressed, the operator would sense an abrupt increase in the reaction torque, and when the pin 91 reaches the end of its travel, the operator is unable to rotate the steering wheel 51 any further.

Similarly, when the signal 61 ("FULL ON") corresponding to end-of-stop steering is transmitted to the friction brake assembly of FIG. 5, the coil 115 will apply sufficient torque to the brake disc 113 to prevent any further rotation of the shaft member 117, and when the spring 131 is fully compressed, and again the operator senses an abrupt increase in the torque feel, and when the key member 121 reaches the end of the slot portion 129, the operator is unable to rotate the steering wheel 51 any further.

If the steering wheel 51 is then released by the operator, the springs (93 or 131) would decompress, causing reverse rotation of the steering wheel, but with the friction device still fully engaged, and unable to rotate. However, the reverse movement of the steering wheel 51 and steering column 53, under the influence of the springs (93 or 131), is detected by the steering motion sensor 57, and an appropriate signal 59 transmitted to the ECU 15. In order to have this capability (to steer easily away from the stops), it is important that the spring deflection, when fully compressed, is larger than the minimum resolution of the sensor 57. For example, the springs 93 typically permit a relative rotation of about 10 degrees between the spool valve 83 and the sleeve valve 85, while a typical sensor resolution would be about 1 or 2 degrees.

As was noted previously, one item of information carried by the signal 59 is direction of rotation, so that the signal 59, generated after the spring-influenced reverse rotation of the wheel 51, would inform the ECU 15 that steering away from the stops is now occurring, and as a result, the signal 61 would be modified (now "0") to "release" the friction device. With the friction device now released, the operator is able to accomplish a normal steering maneuver in the opposite direction.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. In a steering system of the type including a friction type steering reaction device adapted to receive a manual steering input, the reaction device including a first member and friction reaction means operable to resist rotation of said first member; characterized by:

(a) said friction reaction device including a first shaft fixed to rotate with said manual steering input, and means operable to impose upon said first member a predetermined, minimum resistance to rotation of said first member, corresponding to a predetermined minimum steering reaction torque;

(b) a spring biasing arrangement having a first end seated relative to said first shaft and a second end seated relative to said first member of said friction reaction device;

(c) said first shaft and said first member being configured to permit a predetermined rotational displacement therebetween in opposition to an increasing biasing force exerted by said spring biasing arrangement; and (d) a steering motion sensor being disposed between said manual steering input and said spring biasing arrangement, whereby said manual steering input and said steering motion sensor may rotate even before rotation of said first member begins.

2. A steering system as claimed in claim 1, characterized by said friction reaction means comprises a housing member defining a chamber, said first member being rotatably disposed within said chamber, said housing member having operably associated therewith an electromagnetic coil operable in response to variations in a feedback signal to vary a reaction torque imposed on said first member.

* * * * *